March 24, 1959 J. H. BOSE 2,879,335
STABILIZED MULTIPLEX FREQUENCY MODULATION RECEIVER
Filed Oct. 12, 1953 4 Sheets-Sheet 1
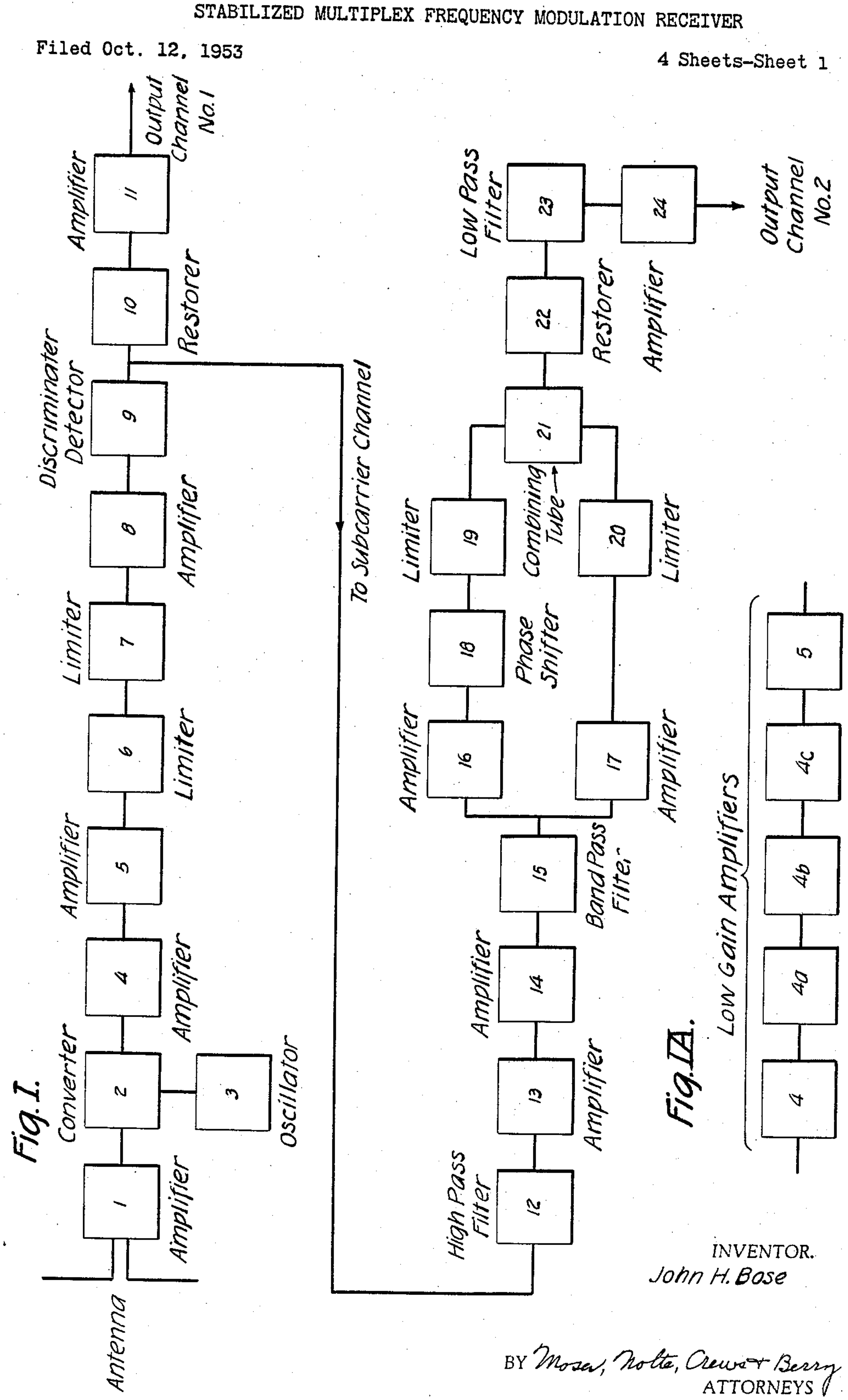
Fig. I. Fig. IA.
INVENTOR.
John H. Bose
BY Moses, Nolte, Crews & Berry
ATTORNEYS Fig. II.
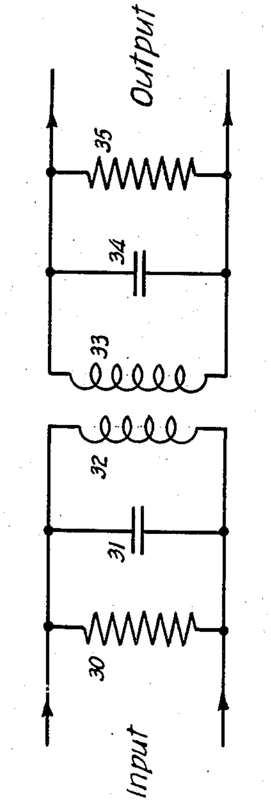
Fig. V.
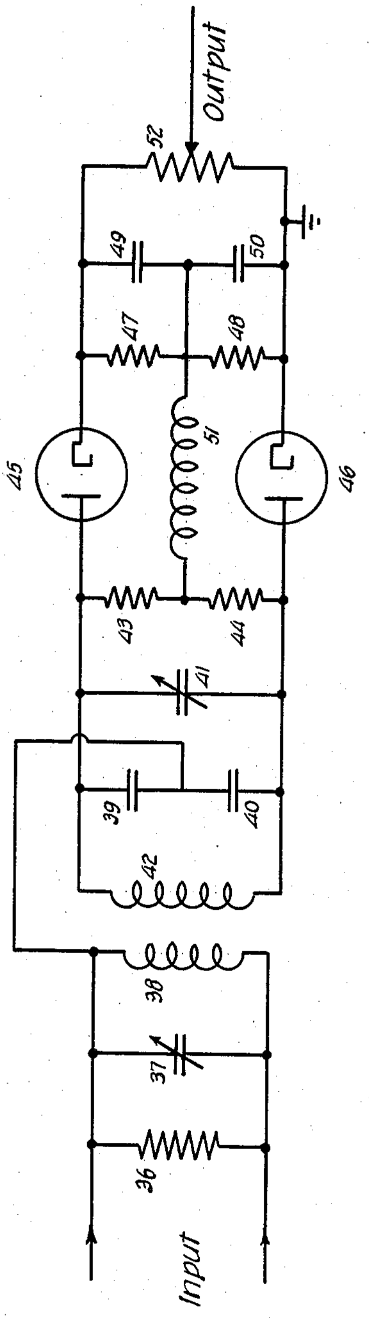
INVENTOR.
John H. Bose
BY Moses, Nolte, Crews & Berry
ATTORNEYS STABILIZED MULTIPLEX FREQUENCY MODULATION RECEIVER
Filed Oct. 12, 1953 4 Sheets-Sheet 3
Fig. IV. Complete Amplifier
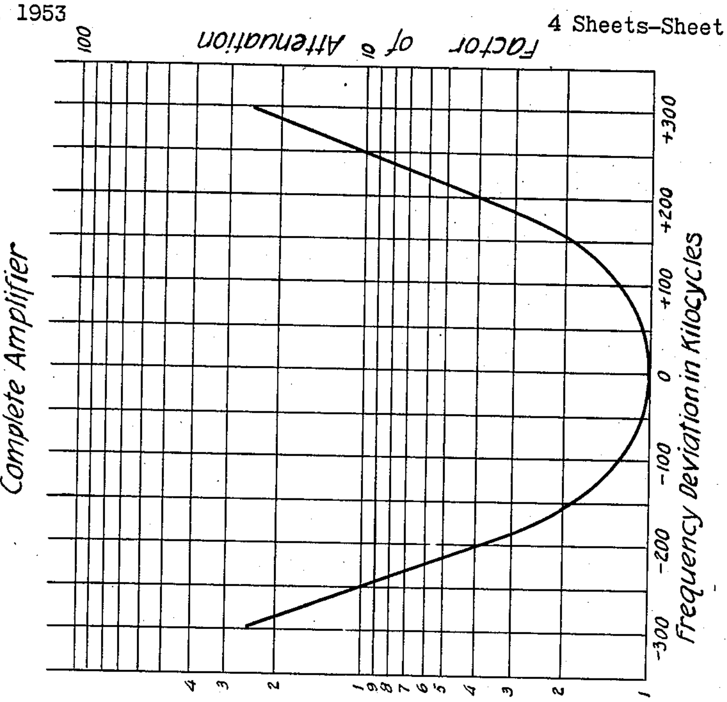
Fig. III. Individual Stage
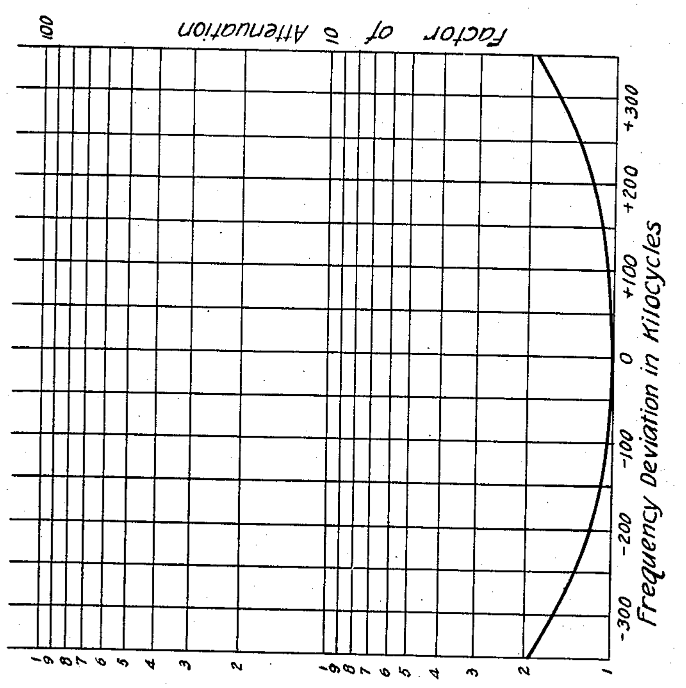
INVENTOR.
John H. Bose
BY Moses, Nolte, Crews & Berry
ATTORNEYS March 24, 1959 J. H. BOSE 2,879,335
STABILIZED MULTIPLEX FREQUENCY MODULATION RECEIVER
Filed Oct. 12, 1953 4 Sheets-Sheet 4
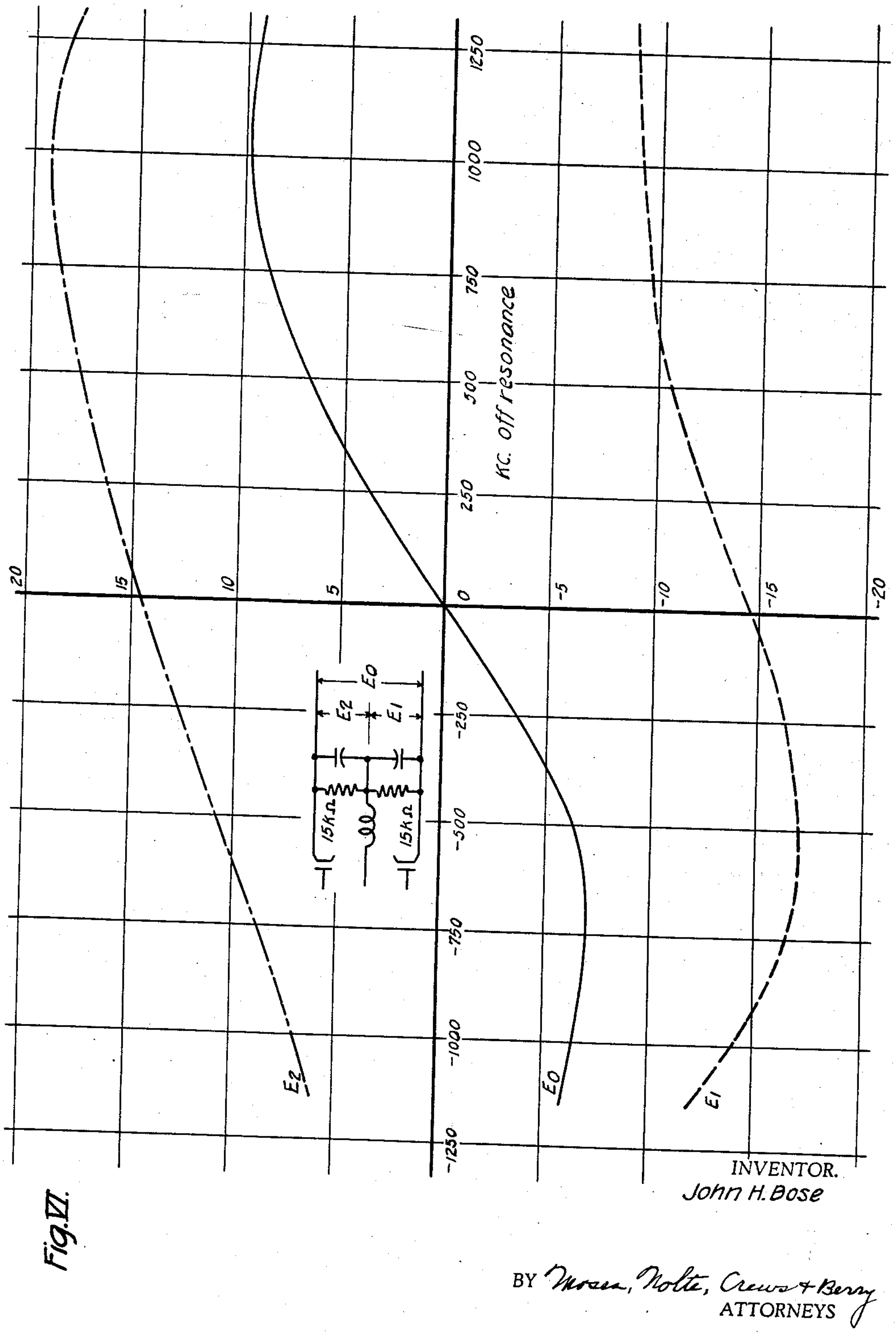
Fig.VI.
INVENTOR.
John H. Bose
BY Moses, Nolte, Crews & Berry
ATTORNEYS United States Patent Office 2,879,335

Patented Mar. 24, 1959

2,879,335

STABILIZED MULTIPLEX FREQUENCY MODULATION RECEIVER

John H. Bose, New York, N.Y., assignor to Esther Marion Armstrong, executrix of the estate of Edwin H. Armstrong, New York, N.Y.

Application October 12, 1953, Serial No. 385,369

4 Claims. (Cl. 179—15)

This invention relates to improvements in receivers for frequency modulation multiplex systems. It has for its object a reduction in cross modulation between channels, particularly in multiplex operation of receivers for broadcast use. Other objects of the invention will appear hereinafter.

The particular problem to which this invention provides the solution is the following one. Without increasing the effective bandwidth, it is desirable to be able to transmit two or more channels of programming in broadcasting simultaneously over a common carrier from a common transmitter, either for the purpose of providing separate and additional programs, producing the binaural effect, or of furnishing on a second or auxiliary channel information which is related to the main program but which may not be of general interest to the major part of the listening audience. It is essential that the "cross-talk" or "cross-modulation" or the leakage of one channel's program content into the other be kept to an extremely low level. This level must be substantially lower than that which has been deemed acceptable in ordinary multiplexed communication circuits where the quality of transmission is essentially low and where the presence of a certain amount of cross-talk does not interfere with the primary object or criterion—the transmission of intelligence.

In broadcasting where the essential requirement is transmission of entertainment, a large part of which is musical, it is necessary for the receiving system to reproduce without distortion over a much greater dynamic range than is necessary for communication circuits—hence the quality of reproduction in one channel is particularly vulnerable to cross-talk when a diminuendo of that channel coincides with a crescendo of another. It has been determined by observation of the transmission of a large number of test programs in actual broadcast practice that any cross-talk which is audible is distracting and annoying, and the safe rule to follow to guard against this annoyance is to reduce the cross-talk level below the residual noise level of the channels involved which, as first indicated in U.S. Patent 1,941,069 and as is now generally recognized, may be made so low as to be inaudible when the system is properly designed.

In multiplex system operation, cross-modulation may be produced either in the transmitting circuits or in the receiving circuits or both simultaneously. U.S. Patent 2,630,497 discloses a transmitting means whereby cross-modulation in the sending end of the system may be reduced to such low values that the problem at that end of the circuit may be considered as solved. It is the purpose of this specification to explain how the difficulties at the receiving end may be overcome.

The present invention is concerned with a multiplex receiver of the general character shown in Fig. 5 of U.S. Patent 2,630,497 and involves novel means for reducing inter-channel cross talk.

In the common intermediate frequency amplifier portion of the usual multiplex receiver, cross-talk is likely to be produced by slight non-linearities in the phase-frequency characteristics of the tuned circuits. In accordance with the present invention, broadly tuned low impedance coupling circuits are provided which avoid such cross-talk producing non-linearities. The selectivity of each stage is thereby reduced as well as its gain and cascaded tuned circuits and amplifier stages are provided in sufficient number to obtain the selectivity required for the prevention of adjacent channel interference and at the same time obtain the desired gain. This is accomplished while maintaining the overall phase-frequency characteristic of the intermediate frequency amplifier sufficienly linear to prevent appreciable inter-channel cross-talk.

At the discriminator-detector which is common to the multiplexed channels, and which is another portion of the receiver where inter-channel cross-talk is likely to originate, a two branch balanced circuit arrangement is provided in which the individual distortion levels of the two branches are extremely low. The novel amplifier and discriminator combine to prevent cross-talk without resorting to delicate and critical balancing adjustments of the component circuit elements which has heretofore been necessary.

The explanation will be given in connection with the accompanying drawings, in which:

Fig. 1 is a block diagram of the circuit of a multiplex receiver;

Fig. 1A shows a series of low amplification amplifier stages;

Fig. 2 shows the coupling transformers of the intermediate frequency amplifier;

Fig. 3 is the characteristic of the transformer shown in Fig. 2;

Fig. 4 is the overall characteristic of a series of transformers of the type shown in Fig. 2;

Fig. 5 is a circuit diagram of the discriminator-detector of the main circuit of the receiver; and Fig. 6 shows the characteristics of the two balanced circuits or branches of the discriminator shown in Fig. 5.

The multiplex frequency modulation receiver shown in Fig. 1 has a main multiplex channel including an RF amplifier 1, a heterodyne converter 2 connected to an oscillator 3, an intermediate frequency amplifier 4—5 comprising a number of amplifying tubes and selective circuits, followed by limiters 6, 7. The output level of the limiter 7 is raised by a broad band amplifier 8 and passed to a discriminator-detector 9. The main channel output from the detector is led directly through the usual restorer and audio amplifier to the loudspeaker. The output of the multiplex detector 9 is also connected to auxiliary channel demodulating apparatus through a high-pass filter 12. This auxiliary channel contains amplifiers 13, 14, a band pass filter 15, a limiting and detecting network 16—20 which may be that shown in my application filed herewith, Serial No. 385,482, and the usual restorer 22, low-pass filter 23 and audio amplifier 24.

In such a receiver, there are, I have found, in the multiplex portion of the receiver two principal places where distortions leading to cross-modulation effects may be serious. These are the tuning circuits of the IF amplifier 4—5 and the discriminator or demodulator 9.

The problem in the IF amplifier arises because, in the practical allocation of channels, a maximum bandwidth of 200 kc. per channel is all that can be allotted to a station. Maintaining of a linear phase shift over the working range of the channel (150 kc. or more) and obtaining sufficient selectivity to exclude adjacent or nearby channel transmission present mutually contradictory requirements. If the phase shift cannot be maintained linearly with frequency shift over the working range of the channel, then the variations in frequency of the main channel modulation by reason of the lack of linear phase shift impress themselves upon the second channel by impairing the linearity of the frequency change of that channel occurring in accordance with the initially impressed modulation and as a consequence thereof, when the second channel is demodulated it will reproduce some of the modulations of the main channel.

If the usual two-stage amplification with a gain of about 100 per stage is used in the intermediate frequency amplifier, it is possible to adjust the tuning of the transformers of the two stages so that their respective phase distortion effects tend to cancel out. The adjustment is an extremely delicate one, since phase distortions too small to produce measurable changes in the amount of amplification may nevertheless cause serious cross-talk. The adjustment must, therefore, be based on direct observation of cross-modulation effects. Thus, as a practical matter, it is necessary in order to secure a satisfactorily linear phase shift, to make adjustments of the two stages of the amplifier which balance out the cross-modulation effect of one stage against the cross-modulation effect of the other stage, or which tend to neutralize the cross-modulation effects occurring in the discriminator detection system. This requires that the adjustments must be made during the reception of signals from a low-distortion multiplex transmitter, such as that shown in U.S. Patent 2,630,497, and the cross-talk must be observed and measured during the tuning adjustments.

The elimination of cross-talk obtained from this delicate adjustment is not permanent. It may be satisfactory at one signal level and entirely unsatisfactory at another. In any event, after a period of time, the amount of cross-talk will be found to have increased beyond tolerable limits, even though the overall characteristic of the multiplex portion of the receiver has not undergone a measurable change. The slight changes in the constants of the tuning inductances and condensers caused by aging or changes in temperature are sufficient to vitiate the original adjustment.

A receiver adjusted in the manner which has been described is entirely unsatisfactory for practical use, since its initial freedom from cross-talk will soon disappear and the test setup required for restoring the initial adjustment is so complicated and the delicate readjustment which is required is so fine and so critical that it cannot be performed by a service man.

The second part of the problem, that of cross-modulation in the discriminator circuit, is particularly difficult because of the relation between the frequencies of the main channel and the auxiliary channel which makes the auxiliary channel highly vulnerable to the effect of harmonic distortion arising in the detection process of the rectifiers of the multiplex discriminator detector 9 which can produce harmonics of the higher frequency currents of the modulations on the main channel that lie directly in the frequency range of the auxiliary channel. This effect is not due to cross-modulation on account of the lack of linear phase shift but depends on the lack of linearity of the discriminator characteristic with an additional effect superimposed thereon, which will be referred to as detector distortion. This cross-modulation effect results because the band of component frequencies of the auxiliary channel lies in the twenty to fifty thousand cycle range, and the second and third harmonics of the main channel which are those of greatest amplitude must fall directly into the auxiliary channel's pass band. Hence, it is essential that the common discriminator-detector system of the multiplex portion of the receiver, which is connected to the auxiliary channel, have extremely low distortion. The method which has been used heretofore to reduce the harmonic distortion of a balanced discriminator-detector system is to suitably adjust the two branches of the system in order that distortion produced in one branch would be balanced out by that in the other branch so as to produce an overall output with a low level of harmonic distortion. I have found that this method of obtaining a low distortion at the output of the discriminator does not eliminate cross-talk, but that cross-modulation is produced by distortions in the separate branches of the discriminator-detector. These are non-symmetrical and cannot be made to balance out.

It will be observed that the cross-talk here results from a combination of amplitude modulation distortion products which are due to the lack of linearity in the two halves of the frequency deviation characteristic of the discriminator and to the lack of linearity in the detection process; and the effect on the second channel may be brought about by the harmonics of the first channel passing directly into it, as well as by a cross modulation process of the phase of the subcarrier frequency in subsequent non-linear pieces of apparatus in the second channel.

Thus, at both points in the circuit at which cross-talk is produced—the IF amplifier and the discriminator-detector—it is impossible to permanently eliminate cross-talk effects by balancing out the phase or amplitude distortion of one element of the circuit against that of another element of the circuit. A multiplex receiver capable of practical and useful operation for receiving multiplex broadcasting cannot be made by such balancing.

I have discovered that a practical multiplex receiver for broadcast reception may be made by constructing each separate element or circuit component of the multiplex portion of the receiver in such a way that none of the individual elements or components produces a distortion which will cause audible cross-talk. (By "audible" cross-talk I mean cross-modulation whose level is above the residual noise level, so that it can be heard when the receiver is adjusted in the usual manner to make the residual noise inaudible.) To produce a receiver embodying the results of this discovery, I provide an IF amplifier composed of circuit elements each of which maintains a highly linear phase shift throughout its working range of frequencies and signal levels and is thus free from the phase distortion which would produce cross-talk; and I provide a balanced discriminator in which each branch has too low a distortion effect to produce cross-talk. In this way, I eliminate cross-talk without requiring any balancing of the distortions produced by one element against those produced by another.

It has been further discovered that with the arrangement hereinafter described, that the noise level on the second channel may be held to better than 60 decibels at a point which marks the limit of service of an F.M. station as specified by the Federal Communications Commission—namely, a field strength of 1 millivolt per meter at 30 feet above ground. The signal-to-noise ratio of 60 decibels is the equal of that presently specified as the requirement of the Federal Communications Commission for the signal-to-noise ratio that must exist in present-day F.M. broadcasting for a signal as it leaves the transmitting antenna, that is to say, equipment designed in accordance with the present specification will attain at the limit of the service range of a standard broadcast transmitter on its second channel the same signal-to-noise ratio that is specified for a single channel as it emanates from the transmitting station. The 1 millivolt line usually lies 40 to 60 miles distant from the standard F.M. transmitter.

The intermediate frequency amplifier 4—5 of the receiver consists of a number of amplifying tubes coupled by selective transformer circuits of the type shown in Fig. 2. The characteristic of this transformer shown in Fig. 3 is such that it will keep the cross-modulation due to non-linear phase shift down to a sufficiently low level to make it comparable with the noise level. The characteristic required to do this is, however, so flat as to show insufficient selectivity to exclude nearby channels. I have found, however, that by multiplying the number of IF stages beyond that customarily used, it is possible to obtain an overall characteristic having the selectivity required to exclude adjacent channels, while at the same time holding the overall departure from the linear phase shift requirement to limits sufficiently low to prevent the cross-talk reaching observable levels. Thus, by using five IF stages 4, *4a*, *4b*, *4c* and 5 (Fig. 1A) coupled by the transformers shown in Fig. 2, I obtain an overall characteristic of the form illustrated in Fig. 4. It is important to maintain the shape of this curve, and this can only be done by preventing regeneration which otherwise tends to distort one end or the other of the flat top part of the characteristic. Hence, low impedance transformers as hereinafter specified should be used, with low interstage amplification values. These values should be reduced from the normal intermediate frequency amplification for simplex operation of about 100 per stage to 5–10 per stage for effective multiplex operation. Since low values of amplification per stage are required, low impedance values of capacity and inductance may be used, thereby increasing the stability of adjustment and rendering the alignment of the intermediate frequency selectivity characteristics relatively independent of tube changes, temperature changes, etc. When such changes of a permanent nature do occur, however, I find they may be corrected by the simple expedient of tuning the transformer circuits for maximum amplification to restore the IF system to its proper operating alignment.

The discriminator-detector 9 of my receiver is of the balanced-circuit type and has two branches whose individual distortion levels are extremely low. The arrangement of a phase shift type of discriminator for effecting this result is shown in Figure V. Here 36, 37, 38 represents the primary circuit of a phase shift discriminator, the transformer primary winding 38 being of low impedance and heavily damped by the resistance 36 which may be of the order of 2500 ohms. It is coupled to the secondary circuit through magnetic coupling between the coils 38 and 42 and the high potential end of the primary connected to the secondary through the matched condensers 39, 40. The secondary is loaded heavily by means of the resistances 43, 44 whose joint resistances approximate that of the primary loading resistance 36. 45 and 46 are detector diodes and 47 and 48 are relatively low detector load resistances, by-passed by capacities whose impedance for the sub-carrier frequencies is made relatively large with respect to the values of the resistance loads of the detectors. 51 represents a choke for completing the direct current path for the detectors while furnishing a high impedance for the intermediate frequency current.

For the purpose of completing the disclosure of this part of the receiver, the following electrical dimensions are given to assist the man skilled in the art to reproduce the desired results. For an intermediate frequency of the standard value of 10.7 megacycles, the transformer coils 32, 33 of Fig. 2 may have an inductance of 2.6 microhenrys, the condensers 31, 34 a capacity of 75 micromicrofarads, and the parallel resistors 30, 35 have a resistance of 6,200 ohms. The degree of coupling between the coils of the transformer should be adjusted to give a characteristic such as illustrated in Fig. 3. With respect to the characteristics of the multiplex discriminator circuit illustrated in Fig. 5, 38 may have an inductance of 3.4 microhenrys, 37 a capacity of 65 micromicrofarads, 36 a resistance of 2500 ohms. 42 has an inductance of 6 microhenrys, 39, 40 are capacities of 75 micromicrofarads, 41 a 10 micromicrofarad trimmer and 43, 44 resistances of 1200 ohms each, 47, 48 the resistances of 10,000 ohms each and 49, 50 capacities of 50 micromicrofarads apiece. The inductance 51 has a value of 150 microhenrys.

With these electrical constants, and by properly adjusting the magnetic coupling between the inductances 38 and 40 a characteristic of the form illustrated in Fig. 6 is obtained and the individual distortions in the two balanced detector circuits are below one-half of one percent. They may be made to approximate one quarter of one percent. Under these conditions, satisfactory freedom from cross-modulation effects of the main channel on the auxiliary channel may be obtained with the auxiliary channel filtering and detecting system illustrated by the apparatus designated 12—24 in the diagram of Figure 1.

It will be understood from the foregoing description that the solution of the problem of cross-talk lies in the elimination of cross-talk producing non-linearities individually at their respective sources, namely at each individual component of the system which contributes to the overall cross-talk, as a result of which the complicated balancing of cross-talk producing non-linearities at different parts of the system is made unnecessary and stable operation over protracted periods of time and varying temperature conditions becomes possible.

It will also be understood that while the operation has been described only with respect to two channel operation, it may be applied to any additional number of channels which it may be desired to operate and that the available bandwidth in the frequency spectrum will permit.

I claim:

1. In a multiplex frequency modulation receiver having heterodyne converter means to which frequency modulation multiplex signals are applied for converting said multiplex signals to a wave comprising component frequencies which lie in a band of intermediate frequencies having a predetermined fixed frequency range; and discriminator means for simultaneously demodulating the full range of said intermediate frequencies; the combination of an intermediate frequency amplifier means having an input coupled to said converter means and an output coupled to said discriminator means; said amplifier including a plurality of low impedance tuned circuits disposed in cascaded relationship in the transmission path through said amplifier means, said tuned circuits including means for damping each circuit to produce a linearity of phase shift with respect to frequency throughout the full range of said intermediate frequency band of such a degree as to keep the cross-modulation among the several multiplex signals of said intermediate frequency wave below the residual noise level in the course of the amplification of said wave, said tuned circuits each individually failing to provide selectivity sufficient to exclude undesired signals from adjacent channels, said amplifier means including at least three of said tuned circuits to produce a cumulative selectivity which effectively excludes undesired signals and simultaneously effectively maintains phase-frequency linearity in said transmission path of said intermediate frequency amplifier means.

2. The combination according to claim 1, said amplifier comprising a plurality of stages including coupling transformers comprising inductively coupled primary and secondary windings, a capacitor connected across each primary winding and a further capacitor connected across each secondary winding, and wherein said damping means comprises damping resistors each connected across one of said windings in parallel with one of said capacitors.

3. In a multiplex frequency modulation receiver, according to claim 1, said discriminator means including an input transformer coupled to the output of said intermediate frequency amplifier means; resonating and damping means connected with said input transformer; and two discriminator branches connected with and fed by said transformer, the damping means sufficiently damping each of said branches for preventing the generation of harmonics in each branch.

4. In a multiplex frequency modulation receiver according to claim 1, said discriminator means including transformer having magnetically coupled primary and secondary windings; a damping resistor connected across said primary winding for heavily damping the same; a pair of serially connected matched condensers connected across said secondary winding, said primary winding having one end connected to the junction between said matched condensers; a pair of equal serially connected resistors connected across said secondary winding, the joint resistance of said resistors being approximately equal to the resistance of said damping resistor, said discriminator further including two balanced branches connected to said secondary winding, each of said branches comprising a detector diode and a relatively low detector load resistance by-passed by a capacitor the impedance of which at the frequency of said sub-carrier is relatively large with respect to the value of said load resistance.

References Cited in the file of this patent

UNITED STATES PATENTS

| | | |
|---|---|---|
| 2,312,194 | Roder | Feb. 23, 1943 |
| 2,585,717 | Achenbach et al. | Feb. 12, 1952 |
| 2,609,494 | Wilmotte | Sept. 2, 1952 |
| 2,630,497 | Armstrong | Mar. 3, 1953 |
| 2,654,841 | Dutton | Oct. 6, 1953 |
| 2,682,606 | Keizer et al. | June 29, 1954 |
| 2,776,429 | Olerud | Jan. 1, 1957 |